H. H. DYKE.
TOUR CAR.
APPLICATION FILED SEPT. 6, 1917.
1,259,966.
Patented Mar. 19, 1918.
3 SHEETS—SHEET 1.
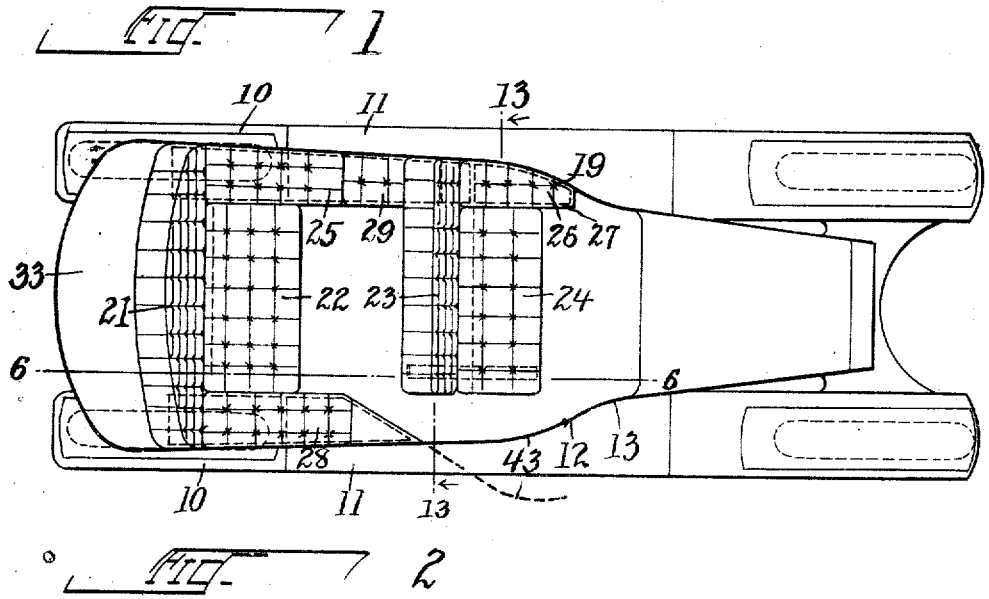
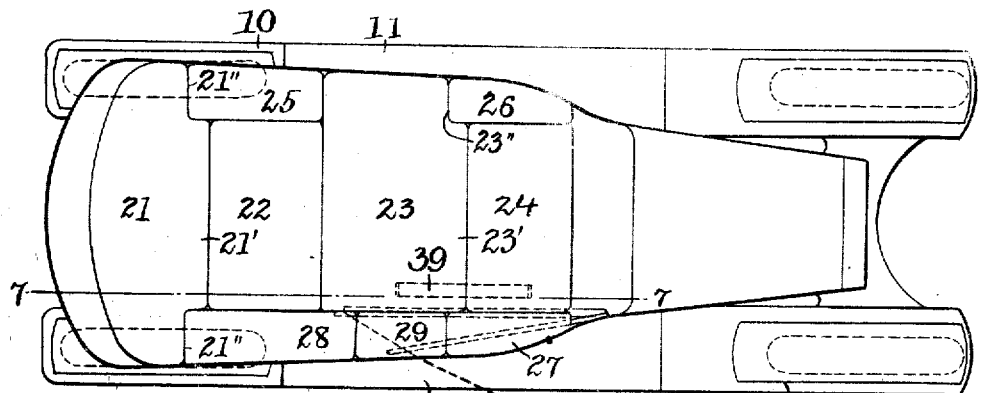
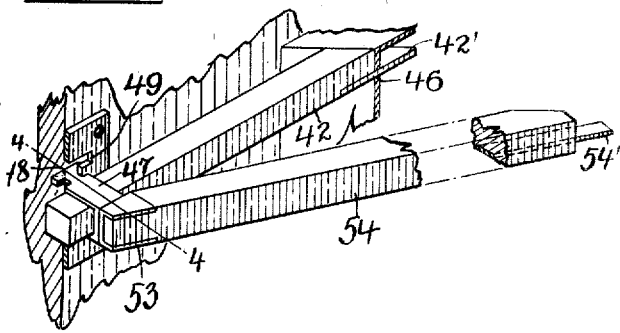
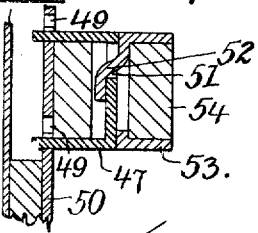
INVENTOR
Herbert H. Dyke H. H. DYKE.
TOUR CAR.
APPLICATION FILED SEPT. 6, 1917.
1,259,966.
Patented Mar. 19, 1918.
3 SHEETS—SHEET 2.
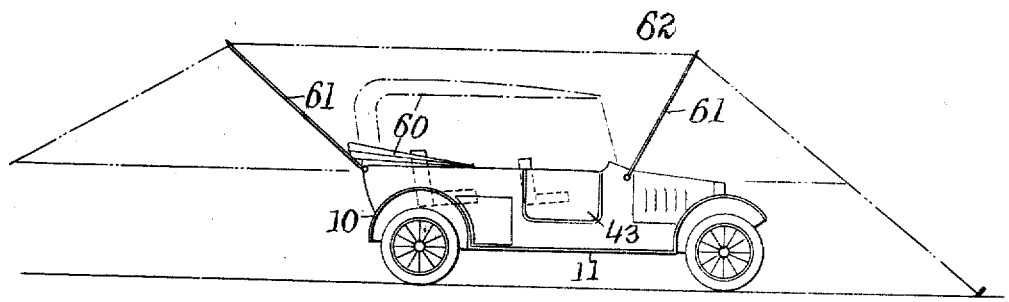
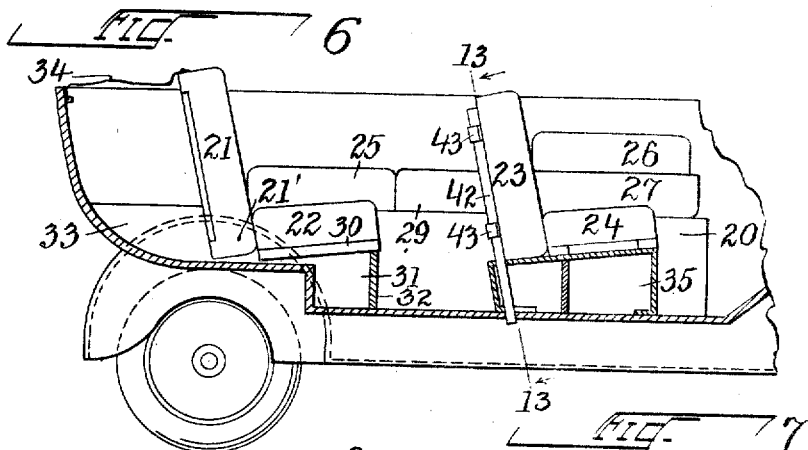
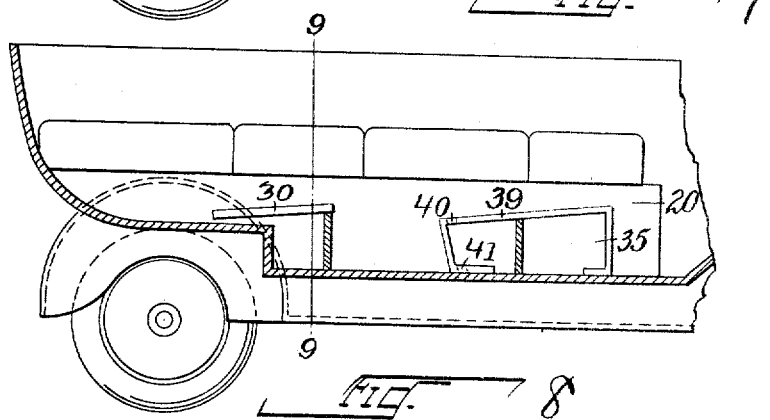
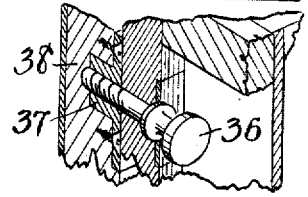
INVENTOR
Herbert H. Dyke H. H. DYKE.
TOUR CAR.
APPLICATION FILED SEPT. 6, 1917.
1,259,966.
Patented Mar. 19, 1918.
3 SHEETS—SHEET 3.
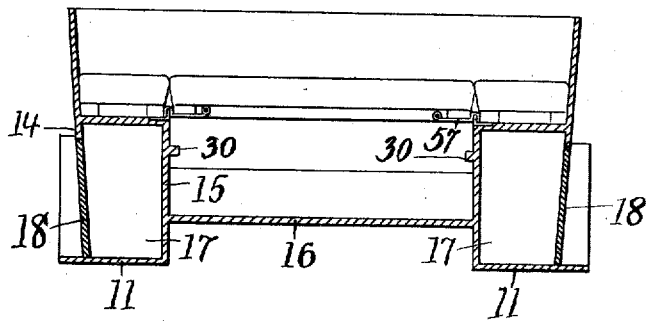
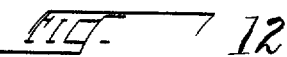
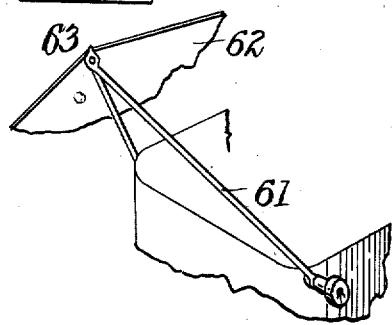
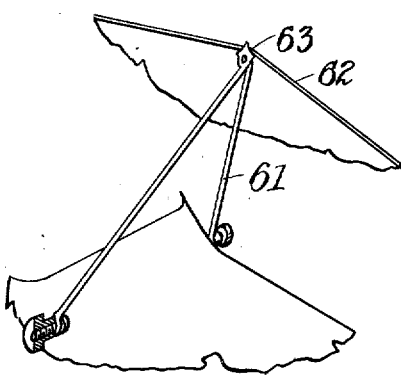
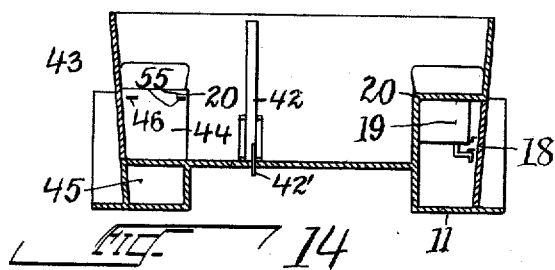
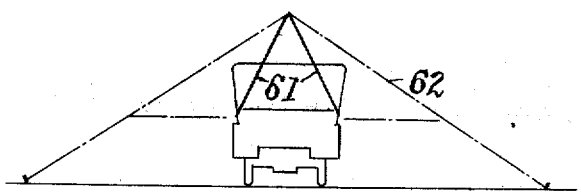
INVENTOR
Herbert H. Dyke

UNITED STATES PATENT OFFICE.

HERBERT H. DYKE, OF MONTCLAIR, NEW JERSEY.

TOUR-CAR.

1,259,966.

Specification of Letters Patent.  Patented Mar. 19, 1918.

Application filed September 6, 1917. Serial No. 189,966.

*To all whom it may concern:*

Be it known that I, HERBERT H. DYKE, a citizen of the United States, and a resident of Montclair, county of Essex, and State of New Jersey, have invented a new and useful Tour-Car, of which the following is a specification.

My invention relates to automobile bodies, and one of its objects is to provide a body in which large spaces heretofore wasted are utilized to provide fully inclosed compartments for carrying a variety of articles where they are fully protected and are entirely out of the way and out of sight and yet are readily accessible when needed; another object is to make the body and seat upholstery readily convertible from a comfortable seating arrangement to a comfortable bed of width and length sufficient to accommodate several persons. These results are accomplished without marring the beautiful simple sweeping lines now attained in the manufacture of automobile bodies. In fact the appearance is improved, since with the new body still simpler and more sweeping lines are obtained and a neater appearance is secured. This is especially true in the case of the up and down lines of the car body, for with my new body substantially straight up and down or vertical lines are secured instead of the customary inward curvature at the lower part of the body and outward curvature of the apron extending from the body to the running board.

A body constructed in accordance with my invention adds greatly to the convenience of ordinary touring, since, even with a comparatively small car, baggage, extra clothing, and so forth, may be carried in closed compartments within the car body where they are protected and not exposed to view and out of the way and yet readily accessible. Because of the feature of ready convertibility of the body upholstery and seat cushions and backs into a large comfortable bed, it is especially adapted for the use of army officers who are often obliged to snatch a few moments of sleep wherever they may happen to be, and its greatest and most extended field of use is for automobile camping tourists for the reason just referred to and further because of the ample provision of closed compartments for carrying baggage, camp equipment, and the provision of camping conveniences generally, and for these reasons I have coined the term "tour-car" as being suggestive of the scope of its utility.

With the foregoing and related objects in view, my invention consists in the construction, combinations, improvements, parts and devices hereinafter set forth and claimed.

In the accompanying drawings I have illustrated an embodiment of my invention for the purpose of affording a clear understanding of the invention, and have also shown a preferred form of tent used for camping with the car, which, however, is not claimed in the present case.

In the said drawings forming a part of this specification, and wherein the same reference numerals are applied uniformly to designate the same parts throughout, Figure 1 is a plan view of a car body embodying my invention arranged for the seating of passengers and for driving. Fig. 2 is a similar view but with the seat and body upholstery formed into a bed. Fig. 3 is a fragmentary perspective detail view of means for supporting a part of the bed adjacent to the car door. Fig. 4 is a sectional detail view taken on line 4—4, Fig. 3. Fig. 5 is a diagrammatic view of a tent and its supports on the car. Fig. 6 is a longitudinal section on the line 6—6, Fig. 1, the seats being arranged for driving. Fig. 7 is a longitudinal sectional view taken on the line 7—7, Fig. 2, the cushions being formed into a bed. Fig. 8 is a fragmentary perspective and sectional view of means for securing the seat backs to the body when the seats are arranged for driving. Fig. 9 is a transverse cross-sectional view taken on the line 9—9, Fig. 7. Fig. 10 is a detail sectional view of means for supporting seat cushions in position for forming part of the bed. Figs. 11 and 12 are detail views of means for supporting the tent on the car. Fig. 13 is a transverse view on the lines 13—13 of Figs. 1 and 6, and Fig. 14 is a rear end view of a car showing the preferred relation of the tent thereto.

The drawings show one form of my invention as adapted to what is known as a small touring car. The invention is not, of course, limited to a body for such a car, but is illustrated in connection therewith as this is the commonest type of car found in ordinary use.

The body is widened out at its rear so as to extend well over the rear mud guards 10. It may even extend to flush with the outer edge of the rear mud guards and running board 11, but a somewhat better appearance is thought to be obtained when the rear mud guards extend laterally somewhat beyond the body. It is readily possible to obtain a width in this neighborhood of five feet or over, since, as will hereafter be explained, the customary interior padding of the body walls may be very greatly reduced and even entirely eliminated and the thickness of the body wall need not exceed for example, a couple of inches or thereabout or may be even less. Of course in cases where a narrower bed is all that is required, the body may be made correspondingly narrow and padding may be provided on the interior of the body wall if desired.

The body is preferably tapered to a lesser width from the rear toward its front, as this is believed to give a better appearance and also because persons sleeping in the body used as a bed preferably sleep with their heads toward the rear and their feet toward the front end of the car. At the forward end of the car the body lines are preferably merged into the custory cowl and the engine hood, and this may be accomplished in any preferred way, as, for example, by double curves 12 and 13, Fig. 1.

The car body preferably extends down at its sides to the running board 11 in substantially a straight line and if desired the sides of the body may converge somewhat toward one another as they descend, as shown in Figs. 9 and 10, though this is not essential, and the contour may be varied to a considerable extent so long as the sides of the body or extensions thereof extend down to the running board, or if the running board is absent, to substantially the position occupied by the running board.

The downwardly extending sides of the car form the outer walls of compartments adapted to contain and protect such articles as may be placed therein, as baggage, extra clothing, tents, cooking and camping appliances, etc. The inner walls of these compartments are spaced inwardly of the car body at a distance from the outer walls, and when the usual chassis frame is present with side members running substantially longitudinally, the inner walls of the compartments are preferably placed a little distance outside of the longitudinal frame members and extend downwardly, like the outer walls of the body, to or substantially to the running board. The compartments are closed at the bottoms by the running board, or if there is no running board, by suitable bottom walls. In the drawings the outer wall of the body and compartments is indicated by the numeral 14 and the inner wall by the numeral 15, and the floor of the body, which usually extends across the body just above the chassis frame, by the reference numeral 16. The arrangement on both sides of the car is preferably substantially the same except that it may be varied somewhat at the door or doors, if more than one door is provided.

The compartments 17, formed between the walls 14 and 15 and over the running board 11, preferably extend upward to substantially the height of the rear mud guard or slightly higher, and suitable covers are provided forming interiorly extending ledges in the sides of the car body at substantially the height of the top of the rear mud guards. Access may be had to the compartments 17 through the tops thereof, through the inner walls 15 or through doors as 18, 18 in the side of the car body. Where such doors are provided their edges are preferably made as nearly blind as possible so as not to attract unnecessary attention and detract from the appearance of the body. Various convenient devices may be built into the compartments or into still other portions of the car body which may be available therefor, as, for example, in Fig. 13 the water tank 19 is illustrated contained in and opening into one of the compartments and accessible through a door 18.

The provision of the compartments 17 in the manner described results in the provision of inwardly extending ledges 20, 20 on the sides of the car body, but the inwardly extending ledges 20, 20 may be secured in other ways. These ledges are preferably about as high as the rear mud guard so that such mud guards or their housings in the car body do not extend upwardly beyond the edges 20 to interfere with the formation of the bed or the supporting means therefor. The cushions for forming the bed are supported upon these ledges and between them so as to provide a substantially uniform upper surface, and they consist preferably of cushions arranged upon the ledges when the car is arranged for the seating of passengers, together with the seat cushions and seat backs. This may be accomplished in a number of ways. One good arrangement is illustrated in the drawings. 21 is the back cushion of the rear seat; 22 the seat cushion of the rear seat; 23 the back cushion of the front seat and 24 the seat cushion of the front seat. 25, 26, 27, 28 and 29 are cushions similar to the cushions 21 to 24 and preferably comprise the usual wooden frame, springs, supporting strips for the springs attached to the frame, and padded coverings of leather or the like, such as are commonly used in the construction of automobile cushions. The cushions 25 to 29 are comparatively narrow and are adapted to be supported upon the ledges 20, 20, and all the cushions 21 to 29 are preferably used in forming a bed.

When the car is arranged for driving, the seat cushions 22 and 24 are preferably supported between the ledges 20, 20 and at a somewhat lower level than the cushions 25 to 29. The rear seat cushion 22 may be supported on inclined strips 30, 30 placed on the inner walls 15 of the compartments 17, and a storage space 31 may be obtained beneath the rear seat cushion 22, as by the provision of a substantially vertical wall 32. When the seat cushion 22 is so arranged at a lower level than the side cushions 25 and 28, the latter may serve as arm rests or side supports for the passengers who do not ordinarily sit close enough to the side walls of the body to come into contact therewith, and the usual padding on the interior body walls may therefore be reduced or dispensed with, thus making it possible to secure a bed space of substantially maximum width. The rear seat cushion 22, when arranged for seating passengers, is placed in a front to back position to the car body, dependent on the size of the body. When sufficient room is available it is preferably placed somewhat forward of the rear end of the car body and the back cushion 21 is placed immediately back of the seat cushion 22, and at such distance from the rear wall of the car body as to leave a space 33 between it and the rear wall of the car body and extending substantially the entire width of the body and well adapted for the storage of bed clothing and for the reception of extra clothing, hand baggage and the like, and, if desired, this space can be closed as by a flap or apron 34 of water-proof fabric or similar material which may be buttoned in place. The back cushion 21 of the rear seat preferably extends substantially across the car body as shown, and is provided with an extending portion 21' at its middle which is adapted, when the cushions are arranged for seats, to extend downwardly between the ledges 20, 20 and behind and against the seat cushion 22, so that no open space is left between the back 21 of the rear seat and the seat cushion 22. The notched out portions 21'' rest upon the ledges 20. The provision of the projecting part 21' also makes possible the provision of a longer bed than could be otherwise obtained without the use of extra cushions. The seat back 21 can be supported in any desired way to afford a secure support for the backs of passengers. For example, when arranged for driving it may be removably secured to the car body by screws 36 passing through the frame of the cushion 21 and screwed into threaded holes in plates 37 in the frame members 38 of the car body. (See Fig. 8). Other means for this purpose may be resorted to.

The front seat cushion 24 is likewise preferably supported, when driving, between the ledges 20, 20 and at the proper low level to give a desirable riding position. It may be supported, for example, on a suitable storage box 35. The back cushion 23 of the front seat may be secured to the body in the same way as the back 21 of the rear seat. When the entrance door of the body is placed opposite the end of the front seat, as is preferably done, the back 23 of the front seat does not extend to the body wall on the door side of the car, and in such case it may be supported by suitable means from the floor of the car body or from the storage box 35. For example, a strip of iron 39 of suitable form may be secured to the floor of the body or the box 35, or both, and may have means, as holes 40, 41, for receiving a bar 42 which may be removably attached to the seat back 23 as by being inserted into openings formed in clips 43, 43 on the back of the frame of the cushion member 23. The member 42, when not in use for this purpose, may be made use of as one of the members for supporting certain of the cushions forming the bed, as will be set forth hereinafter. The cushion 23 is preferably provided with an extension 23' and notched out portion 23'' to correspond with the similar portions on the seat member 21 and for like purpose. When the body door 43 is arranged opposite an end of the front seat, as is preferably the case, the ledge 20 on the same side is made to extend forwardly only to the neighborhood of such door and is preferably terminated at an angle substantially as shown in Fig. 1, and a person stepping into the car can easily pass either to the front or rear seat through the space provided between the car body (or door) and the end of the front seat, and one can easily move from front to rear seat or vice versa through the same passage. The storage space in this neighborhood, in the form shown, is limited to the space 45 between the floor of the car body and the running board or other lower element of the car body, as is shown in Fig. 13.

When the door 43 is located as shown, means are provided for affording a support in such neighborhood for the cushions needed to complete the bed and corresponding to the support provided by the ledge 20 on the opposite side. This may be accomplished for example, by means of bars bridging the space adjacent to the door, as shown in Figs. 2 and 3. The bar 42 taken from the back of the seat cushion 23 may have a piece of flat iron or the like 42' fastened thereto at an end thereof, which may be received in a slot 46 in the beveled end portion 44 of the ledge 20 on that side and may be embraced at its opposite end by a yoke member 47 having head portions 48, 48 adapted to be removably received in bayonet slots 49, 49 in the plate 50 secured to the frame of the car body, and the member 47 may have an opening 51 therein for receiving a tongue 52 upon a ferrule 53 preferably of metal and secured to the forward end of a second bar 54 which, at its rear end, has a piece of flat iron or the like 54' adapted to be received in a slot 55 (see Fig. 13) in the beveled portion 44 of the ledge 20. These bars or other supporting means serve to complete the ledge 20 on the door side so far as is required for the support of cushions forming a portion of the bed.

The cushion 29, which may be left in place behind the cushion 23 when the car is arranged for driving, may be moved to the opposite ledge when the bed is formed and may occupy the space indicated in Fig. 2. The cushion member 27, which, together with the cushion member 29, is supported by the bars 42 and 54 adjacent to the door, is removed from such position when the car body is arranged for seating passengers, and may be placed anywhere that is convenient in the body or in the storage compartments. For example, it may be inverted (so as to conform to the shape of the body on the opposite side) and placed beneath the seat cushion 26 as shown in Fig. 6, or if the arm rest and side support thus afforded for the driver should be found too high for his comfort, this cushion 26 may be placed elsewhere, as stated.

Various means may be resorted to for supporting the seat cushions 22 and 24 so as to bring their upper surfaces to the same level as the other cushions. For example, when these cushions are of the same thickness as the other cushions, angle irons 56 may be secured to the ledges 20 and hooked members 57 may be pivoted to the frames of the cushions 22 and 24, which may take over the angle iron 56 as shown in Fig. 10 and thereby support the cushions at the same height with the others. When the seat cushions 22 and 24 are arranged to seat passengers, the members 57 may be turned into retracted position, as to the position shown in dotted lines in Fig. 10. It is to be noted that the bar 54 preferably serves to support the adjacent ends of the cushions 23 and 24 as well as to serve as a support for the cushion members 27 and 29. In addition to its support by the tongue 52 or alternatively to the provision of such support, the bar 54 may rest on and be attached to the box 35, if desired.

By providing extensions 21' and 23' on the seat backs 21 and 23, the seat cushions and the back cushions combine in width to make up a bed of ample length for sleeping purposes, length in excess of six feet being readily obtainable, and the forward end of the bed extending preferably forward beyond the forward edge of the front seat as the same is located when the car is arranged for driving. This will readily be apparent from a comparison of Figs. 1 and 2.

The bed formed as described may be of a possible width in excess of five feet and of a possible length in excess of six feet, even in the case of the ordinary small touring car, and being made of the structure used in automobile upholstery and comprising suitable resilient springs (see Fig. 10) and its sections preferably fitting so close together as to form a unitary bed, the parts of which will move substantially in unison, is readily capable of comfortably accommodating three fully grown persons, and as many as four persons not too large can sleep therein, it being noted that the sides of the car body act substantially as side boards for the bed and permit the use thereof up to the extreme edge of each side. The cushions making up the bed being set directly against the rear end of the car body at the rear and being wedged together at the forward end by the narrowing of the car body in that region, and being securely supported in place, are not readily moved from their correct relative position by causes such as the movement of persons sleeping thereon.

In using the car body as a bed, of course, the top 60 of the car may be raised or, if desired, it may be left in lowered position, or other types of top, as a permanent top, may be provided.

The tent which is preferably used in connection with my new body is shown with its supports in Figs. 5, 11, 12 and 14. Inverted V-shaped members 61 are preferably provided with pivotal removable supports upon the car body so that the members 61 may be turned on their pivots from front to back of the car. The forward member 61 may be pivoted at about the dash of the car and the rear member 61 at about the neighborhood of the usual top irons as shown in Fig. 5, or these supports may be pivotally secured in other positions. These members preferably are made up of parts pivoted together near their upper ends so that they may be folded and put away when not in use. If desired they may also be made to telescope and fold into a smaller compass.

The tent 62 has preferably grometed openings 63 at each end of the ridge thereof and into which the points of the members 61 may be inserted, and the tent preferably is formed to extend forward and sidewise and backward about as shown in Figs. 5 and 14. When secured in place as by ropes and stakes or in other suitable ways, the tent so arranged may extend forwardly substantially to protect the front end of the car and backward to a sufficient distance to afford a desirable camping space and sufficiently far at at least one side of the car to afford protected space along the side of the car for a person moving from the door of the car to the tent space at the rear thereof. It may extend at its edges entirely to the ground or may be provided with side walls, as will be obvious. While it will be sufficient for a comparatively low tent to be used, the tent may extend to a sufficient height above the car to provide for the usual top being lowered or raised while the tent is in place, the members 61 in such case being preferably of such form and size and so supported as not to interfere with the folding or raising of the top.

The operation has already been sufficiently set forth in connection with the description.

It is to be understood that the structures described herein are shown and described only for the purpose of affording a clear understanding of my invention and that the scope of my claims is not to be limited thereby, but such changes and modifications may be resorted to without departing from my invention or sacrificing its advantages as are included within the scope of my claims.

Having thus described my invention, I claim:

1. An automobile body having an inwardly extending ledge at each side, and a plurality of cushions adapted to be supported upon and between the ledges to form a bed, the cushions between the ledges being also adapted in altered position to form front and rear seats and seat backs, the front and rear seats being supported below the ledges and the cushions on the ledges serving as arm rests and side supports for persons seated in the car.

2. An automobile body extending outwardly at its sides for substantially the width of the rear mud guards, inclosed compartments within the body at each side extending to substantially the height of the rear mud guard and forming ledges within the body, cushions on said inclosed portions, cushions between said inclosed portions adapted in one position to afford seats and seat backs for seating passengers, and in another position to form a bed with the cushions on the inclosed portions.

3. In an automobile body, ledges extending inwardly on each side and providing inclosed storage space thereunder, a seat between said ledges, and a movable seat back cushion extending both between and over said ledges.

4. An automobile body having an inwardly extending ledge at each side, and a plurality of cushions adapted to be supported upon and between the ledges to form a bed, the cushions between the ledges being also adapted in altered positions to form front and rear seats and seat backs, and others of said cushions being adapted to be supported upon the ledges and to form arm rests.

5. In an automobile body, bodily movable seat cushions and seat back cushions, said back cushions being longer than the seat cushions, additional cushions, means for supporting said cushions in substantially a plane within the body to form a bed, the additional cushions filling spaces at the ends of the seat cushions.

6. In an automobile body, a front seat cushion and front seat back cushion, a rear seat cushion and rear seat back cushion, the back cushions being of greater length than the seat cushions, said seat and seat back cushions being adapted to be rearranged within the body in a substantially horizontal plane and to extend for a length substantially equal to the combined width of the separate cushions, and additional cushions adapted to fill out spaces between the seat and seat back cushions and the body wall.

7. In an automobile body, a ledge extending inwardly of the body wall and providing inclosed storage space thereunder, and a movable seat back cushion extending over said ledge and extending downwardly on the inner side of the ledge.

8. In an automobile body, side ledges extending inwardly thereof, cushions on said ledges, and seat cushions and seat back cushions adapted to be rearranged to form a complete bed within the body in conjunction with the first named cushions.

9. In an automobile body, a rear seat cushion, a rear seat back cushion extending beyond the rear seat cushion at both ends, a front seat cushion, a front seat back cushion extending beyond the front seat cushion at one end, said cushions being adapted to be rearranged in the car body in substantially a plane, and additional cushions adapted to fill out the vacant spaces to form a bed of a width substantially equal to the length of the rear seat back cushion.

10. In an automobile body, seat cushions and seat back cushions, the latter of greater length than the former, said cushions being adapted to be rearranged in the body in substantially a plane, and means for filling out the spaces left vacant between the seat cushions and the body walls.

11. An automobile body having front and rear seat cushions and seat back cushions, and extra cushions serving in conjunction with the seat cushions to provide arm rests for passengers, the said cushions being adapted to be supported in substantially a plane and to form a complete bed within the body.

12. An automobile body having inwardly extending ledges at the side and closed storage compartments therebeneath extending downwardly substantially to the running board, seat cushions and seat back cushions adapted to be supported on and between said ledges, and extra cushions normally resting on said ledges and adapted with the seat and seat back cushions to form a bed of substantial width within the body.

13. In an automobile body, a ledge extending inwardly on one side of the body substantially for the length thereof, an inwardly extending ledge on the other side but shorter, storage compartments under said ledges, a door on the same side of the body on which the short ledge is located, and a storage compartment under the floor and beneath the door.

14. In an automobile body, a ledge extending inwardly on one side for substantially the length thereof, a ledge on the other side but shorter, a door on the last named side, movable means for forming substantially an extension of said shorter ledge adjacent to the door, said ledges and extension being adapted to support cushion members to form a bed within the body.

15. In an automobile body, an inwardly extending ledge with a storage compartment thereunder and extending substantially the length of the body on one side, a similar ledge extending part way along the opposite side of the body, a door in the last named side, and movable means adapted to form substantially a continuation of the ledge on that side adjacent to the door, and bodily movable cushion members adapted to be supported upon and between said ledges to form a bed within the body.

16. In an automobile body, an inwardly extending ledge along one side thereof having a storage compartment thereunder, an inwardly extending ledge on the other side having a storage compartment thereunder, a door on the last named side, and movable means for forming substantially a continuation of said last named ledge adjacent to the door so that the ledge and continuation extend substantially the length of the body on the door side.

17. In an automobile body, inwardly extending ledges on the sides having storage compartments thereunder, the ledge on one side being shorter than the other, a door in the side having the shorter ledge, cushion members adapted to be supported upon said ledges to form a bed, and additional supporting means for said cushions forming substantially a continuation of the said shorter ledge.

18. In an automobile body, ledges extending along the sides thereof having storage compartments thereunder, and a rear seat back cushion having its upper part elongated and adapted to extend above said ledges, and having its lower part shorter and adapted to be received between said ledges, said cushion being adapted to be located some little distance forward from the rear end of the body and providing a storage space behind it at the rear of the body.

In testimony that I claim the foregoing I have hereto set my hand, this 5th day of September, 1917.

HERBERT H. DYKE.